June 2, 1936.  B. M. REYNOLDS  2,042,632
METHOD OF EFFECTING A CONSTANT TEMPERATURE OF A CATALYTIC REACTION
Filed Sept. 7, 1929  2 Sheets-Sheet 1

Inventor
Blythe M. Reynolds
By Thomas L. Wilder
Attorney

June 2, 1936.  B. M. REYNOLDS  2,042,632
METHOD OF EFFECTING A CONSTANT TEMPERATURE OF A CATALYTIC REACTION
Filed Sept. 7, 1929  2 Sheets-Sheet 2

Inventor
Blythe M. Reynolds
By Thomas L. Wilder
Attorney

Patented June 2, 1936

2,042,632

UNITED STATES PATENT OFFICE 2,042,632

METHOD OF EFFECTING A CONSTANT TEMPERATURE OF A CATALYTIC REACTION

Blythe M. Reynolds, Utica, N. Y., assignor to Heyden Chemical Corporation, New York, N. Y., a corporation of New York, and American Cyanamid Company, New York, N. Y., a corporation of Maine Application September 7, 1929, Serial No. 391,076

5 Claims. (Cl. 23—288)

My invention relates to a method of effecting a constant temperature of a catalytic reaction and I declare the following to be a full, clear, concise and exact description thereof sufficient to enable anyone skilled in the art to which it appertains to make and use the same reference being had to the accompanying drawings in which like reference characters refer to like parts throughout the specification.

The object of the invention is to devise a method of controlling the temperature of a catalytic reaction, whereby to effect and maintain a constant predetermined temperature. By way of illustration, in reactions relating to the manufacture of benzaldehyde by the catalytic oxidation of toluol with air, the product desired is the result of a partial oxidation of toluol. It is necessary, therefore, to use a specific catalyst and to control its temperature to a very accurate degree. Small variations from this optimum temperature cause enormous decreases in the resulting yield of benzaldehyde. In such a reaction where the catalyst consists of molybdenum and aluminum and thorium oxides it is desirable to hold the bath temperature at 430° C. in order to produce the greatest yield of benzaldehyde. If the bath temperature varies from 430° C. that is should fall to 420° the yield would be diminished appreciably or should the temperature rise to 450° a large percentage of the benzaldehyde formed would be oxidized further to carbon dioxide before leaving the converter, thereby reducing the yield. For these reasons it is essential that a constant temperature at a predetermined degree be maintained. In so doing it is the purpose of this invention to employ a nonboiling bath. One of the most satisfactory liquids is molten lead. Lead as a bath has excellent qualities because of its high heat conducting capacity. It will be useful, therefore, in conducting away from the reaction zone the excess heat generated by the reaction.

Heretofore, two serious handicaps to the use of lead have been experienced, namely, lead is easily oxidized to litharge in the presence of air and secondly the difficulty of distributing heat uniformly through the bath. Nor is it wise to agitate the lead bath under ordinary circumstances to diffuse the heat for the reason that any mechanical agitation of the lead bath aggravates or stimulates oxidation at the surface where the lead is in direct or indirect contact with the air to form litharge. The formation of litharge is serious in its harmful effects for it not only results in the loss of lead but also substitutes the insulating or nonconductive property of litharge for the conductive property of lead and, thereby, defeats the purpose of heat exchange.

A boiling medium that will boil at a predetermined temperature has certain advantages because the boiling will agitate the bath and thereby, tend to maintain a uniform temperature throughout. Mercury and sulphur are two such mediums heretofore used with handicaps. Mercury is expensive and must be used sparingly to give any degree of commercial success to the process. Furthermore, there is present the danger of poisoning from its fumes which are liable to escape, because of the necessity of employing pressure in connection with the use of mercury.

On the other hand, sulphur as a boiling medium presents a serious corrosive problem, for the reason that none of the metals which have been developed for apparatus structure will withstand its corrosive action.

The present invention overcomes the disadvantages to the use of a liquid nonboiling bath. Furthermore, the present invention has advantages over the use of boiling mediums, among which are mercury and sulphur.

To this end I employ a suitable converter apparatus having chambers for the catalyst which chambers are in indirect heat exchange relation with the non-boiling liquid bath such as a lead bath here used. In order to prevent oxidation of the lead, however, it is kept continuously in an atmosphere of an inert gas, such as nitrogen. Furthermore, the inert gas is bubbled through the lead bath, thereby causing an agitation in the bath similar to that of boiling with the like effect of distributing the heat uniformly throughout the bath. The excess heat generated by the reaction will be removed by cooling the inert gas under external controlled regulations, before circulation or recirculation to agitate the bath. Or the excess heat may be removed by cooling the liquid bath itself through heat exchange to cooling tubes running through the bath by the use of a suitable controlled cooling medium such as air flowing through said tubes.

As an alternative method of distributing the heat throughout the bath, instead of bubbling the inert gas through the nonboiling liquid it may be agitated by a suitable mechanical agitator externally propelled. In this case packing glands must be provided to prevent the inert gas escaping from the space above the bath or to prevent air from leaking into the bath.

The object will be understood by referring to the drawings, in which

Figure 1:
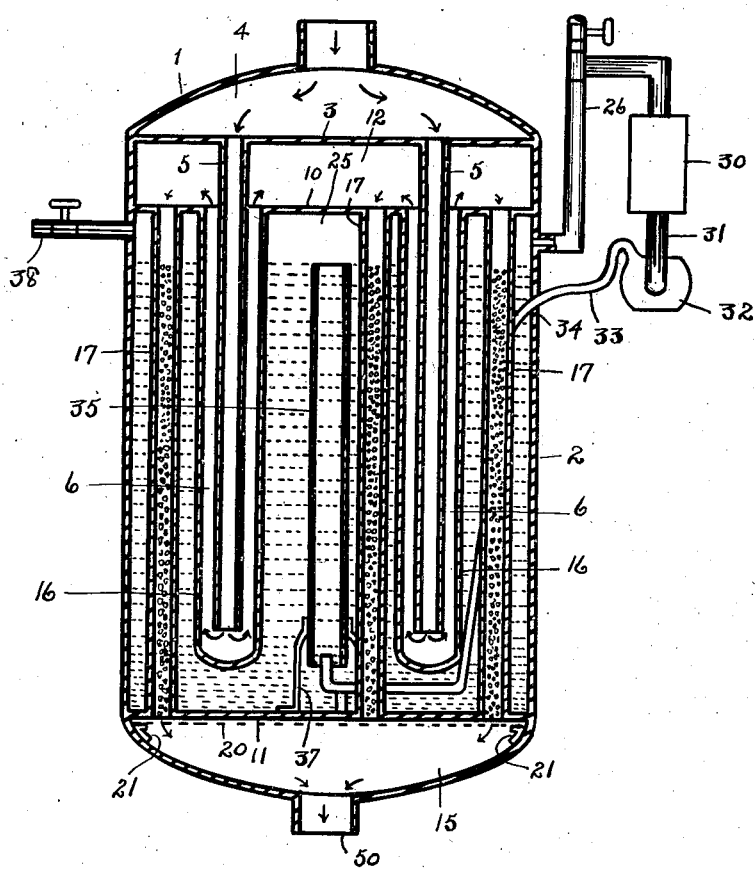
Fig. 1 shows a central vertical section of an apparatus employed in the process, parts being in full.
Figure 2:
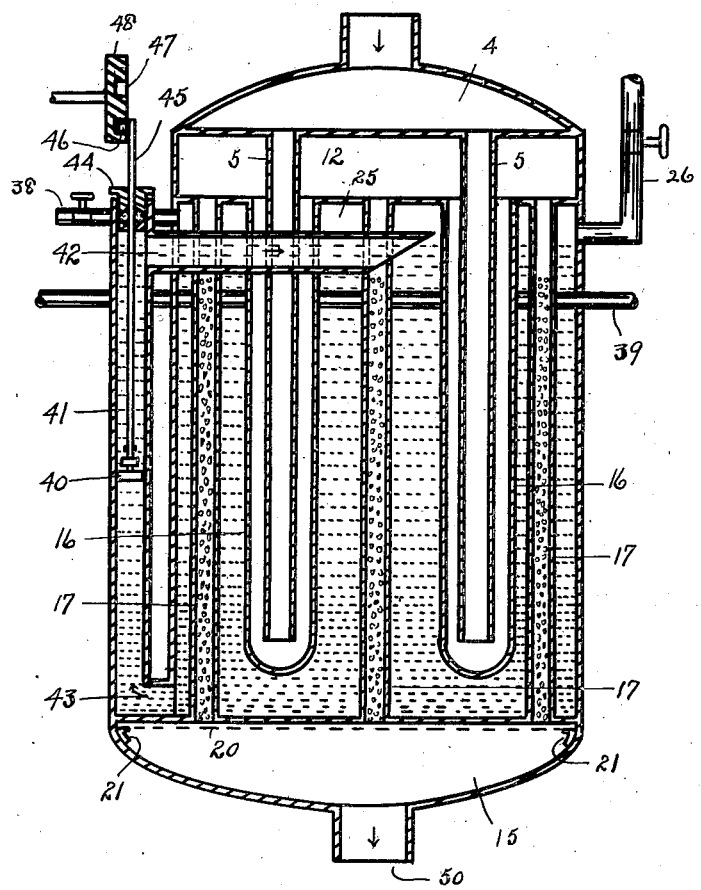
Fig. 2 shows a central vertical section of a modified form of apparatus, parts being in full.
Figure 3:
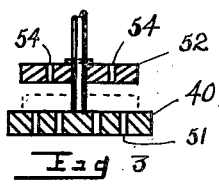
Fig. 3 is an enlarged detail view showing a section of an automatic valve employed.

Referring more particularly to the drawings, any apparatus may be employed which has a converter formed of an outside shell or casing 2 having a horizontal partition 3 that forms a chamber 4 for the reaction gases. Leading off from chamber 4 are depending tubes 5 that are integral or attached in any suitable manner to partition 3 and open at their lower ends. Tubes 5 project down into wells 6 formed between horizontal partitions 10 and 11. Upper partition 10 is located a little below partition 3, whereby to provide a chamber 12 for the expansion of the reaction gases. A further chamber 15 is formed below partition 11 from whence the reacted gases progress to a suitable recovery system, not shown. Wells 6 are formed by the depending walls 16 that are closed at their lower ends.

There is formed also between partitions 10 and 11 catalyst tubes 17 open at both ends, the upper end into chamber 12 and at the lower end into chamber 15. A wire screen 20 is supported against the lower surface of partition 11 by brackets 21, 21, whereby to hold the porous catalyst material from passing out of tubes 17. The chamber formed at 25 below partition 10 is air tight. It is filled moreover, with an inert gas such as nitrogen to prevent any oxidation of the lead.

The nitrogen is supplied through pipe 26 which leads to any suitable source, preferably a pressure cylinder, not shown, to effect a slight pressure on the upper surface of the lead bath, thereby doubly safeguarding against the possibility of air coming in contact with the lead.

The means for cooling the inert gas, whereby to aid in reducing the temperature of the lead bath, embodies a cooling device 30 which is connected to pipe 26 at its receiving end and pipe 31 at its outlet end. Pipe 31 is in communication with the chamber of a blower 32. An outlet pipe 33 connects blower 32 with the interior chamber 25 of the converter 2. To this end pipe 33 projects through the lateral wall 34 of the converter. It extends downward therein and towards the center where it is united with the lower end of one or more tubes such as 35. Tube 35 is open at both top and bottom ends. It is supported by brackets or arms 37 extending upward from partition 11. It will be filled with lead to the same height as said lead rises in the larger chamber 25 surrounding said tube 35. The nitrogen gas will be forced under pressure of pump 32 up tube 35 and thereby lift the lead from the bottom of tube 35 to the top of the lead bath continuously. This action of the nitrogen gas will effect a circulation or agitation of the lead throughout chamber 25, whereby to maintain a uniform temperature in said lead. Moreover, heat may be supplied or taken away from the bath by heating or cooling the outer shell or casing 2 of converter 1, or by a series of tubes 38 horizontally or vertically disposed in converter 1.

Instead of using the inert gas under pressure of pump 32 for creating a circulation or agitation of the lead, it may be set in motion by means of a plunger pump 40 disposed in an annular chamber 41 which is connected to the main chamber containing the bath by passes 42 at the top and 43 at the bottom. A gland or stuffing box 44 is located at the upper end of the casing containing chamber 41 to prevent leakage of the inert gas or the entrance of air to the lead chamber 25. In order to actuate pump 40, pump rod 45 which is connected to pump 40 at its lower end has an offset arm carrying an anti-friction roller 46 at its upper end. Roller 46, rests in a cam groove 47 of a cam 48 which is revolved by any suitable source of power. The reciprocation of pump 40 will set up a circulation of the lead in the direction indicated by the arrows, whereby to effect a complete agitation of the bath. Pump 40 has apertures 51 formed therein for the escape of the lead therethrough when said pump 40 is moving downward. An automatic valve 52 is slidingly mounted on pump rod 45 within certain limits determined by pin 53 fixed in rod 45 and by pump 40. Valve 52 has apertures 54 formed therein for the escape of the lead therepast when pump 40 is on the downward stroke. Apertures 54, however, do not aline with apertures 51 of pump 40, whereby to prevent the escape of lead past valve 52 when pump 40 is on the up stroke.

In order to manufacture any of the by products such as benzaldehyde by the catalytic oxidation of toluol with air under this process, the space in chamber 25 above the surface of the lead bath would be filled first with an inert gas such as nitrogen. The gas could be admitted directly through pipe 26. The admission of the nitrogen gas to the space above the lead would exclude all air therefrom through pipe 38 that has a connection with chamber 25 in casing 2 and thereby avoid its harmful effects as above described. The lead bath would then be heated up to a predetermined temperature 430° suitable for this reaction with the particular catalyst to be used by an external heat applied to the shell or casing 2. For this purpose, gas burners or electric heating elements may be used. The toluol vapor and air in the proportion by weight of one to twenty is blown in at the top and caused to flow continuously through the apparatus in the following course; chamber 4 where it would expand, thence down tubes 5 and up through wells 6 into chamber 12 where it would again expand and seek outlets down through the catalyst tubes 17 filled in this instance with a carrier of granular alundum about $\frac{1}{16}$ inch diameter or of 4-8 mesh coated with a mixture of molybdenum, thorium and aluminum oxides. At 430° C. this catalyst produces very satisfactory commercial yields of benzaldehyde.

The temperature would be kept at 430° by the constant agitation of the lead caused by the inflow of the nitrogen under pressure of blower 32. A small amount of excess heat as a result of the reaction in forming benzaldehyde would be neutralized or compensated for by the incoming nitrogen gas which would agitate the lead as above explained and furthermore have a cooling effect due to its passage through cooler 30 before recirculation. The reacted gases will pass into chamber 15 and out through port 50 to a scrubbing apparatus, not shown, where the benzaldehyde is removed.

Once the operation is started, it may continue uninterrupted indefinitely. By means of a pyrometer, not shown, the temperature of the lead bath can be tested from time to time. Should there be any variation from 430° C., the proper adjustments can be made on cooler 30 to correct the error.

Although I have described my invention as relating to a lead bath, I do not intend to limit myself to that alone as the invention would work equally well with other liquid heat exchange mediums such as molten metals or alloys, inorganic salts or organic compounds.

Having thus described my invention what I claim as new and desire to secure by Letters Patent is as follows:

1. The method for maintaining a catalytic reaction between substances in the vapor phase at a constant elevated reaction temperature, said method consisting in preheating the reaction vapors by heat exchange with a non-boiling liquid heat conducting agent, passing the thus preheated reacting vapors over a catalyst arranged in heat exchange relationship with aforesaid nonboiling liquid heat conducting agent, and passing through the mass of the same an inert gas.

2. The method for maintaining a heat liberating catalytic reaction between substances in the vapor phase at a constant elevated reaction temperature, said method consisting in preheating the reaction vapors by heat exchange with the non-boiling liquid heat conducting agent, passing the thus preheated reacting vapors over a catalyst arranged in heat exchange relationship with aforesaid nonboiling liquid heat conducting agent, and passing an inert cooled gas in a cycle through the mass of the non-boiling liquid heat conducting agent.

3. The method for maintaining a heat liberating catalytic reaction between substances in the vapor phase at a constant elevated reaction temperature below the boiling point of a molten metal, said method consisting in preheating the reacting vapors by heat exchange with the molten metal, passing the thus preheated reacting vapors over a catalyst arranged in heat exchange relationship with aforesaid molten metal, and passing through the mass of the same an inert cooled gas.

4. The method for maintaining a heat liberating catalytic reaction between substances in the vapor phase at a constant elevated reaction temperature below the boiling point of a molten metal, said method consisting in preheating the reacting vapors by heat exchange with the molten metal, passing the thus preheated reacting vapors over a catalyst arranged in heat exchange relationship with aforesaid molten metal, and passing an inert cooled gas in a cycle through the mass of the molten metal.

5. In an apparatus for maintaining a catalytic reaction between substances in the vapor phase at a constant reaction temperature by a non-boiling liquid heat conducting agent and an inert gas, in connection with an outside shell, inlet and outlet passageways, and partitions dividing the inside space of aforesaid shell into two outer compartments of approximately even size and two inner compartments, of which the larger is partly filled with the aforesaid heat conducting agent, substantially parallel to each other and of which the outer compartments communicate with the inlet and outlet, respectively, the combination comprising tubes, containing a catalyzer, traversing the larger inner compartment and directly communicating the smaller inner compartment with the compartment having the outlet, tubes sealed at the bottom and tightly arranged with their open rim in the partition between the inner compartments, extending into the larger compartment suitably parallel to the catalyzer tubes, tubes, arranged with their upper rim in the partition between the inlet and smaller inside compartment, protruding into aforesaid bottom sealed tubes and terminating shortly above said bottom, means for admitting the non-boiling liquid heat conducting agent, means for passing a cooled inert gas through the aforesaid heat conducting agent, and cooperating means for constantly withdrawing the hot inert gas from above and cooling the same for repassing it in the cooled state again through aforesaid heat conducting agent.

BLYTHE M. REYNOLDS.